(No Model.)
A. HITT.
WIND VANE MOTOR FOR CLOCKS.
No. 366,834. Patented July 19, 1887.
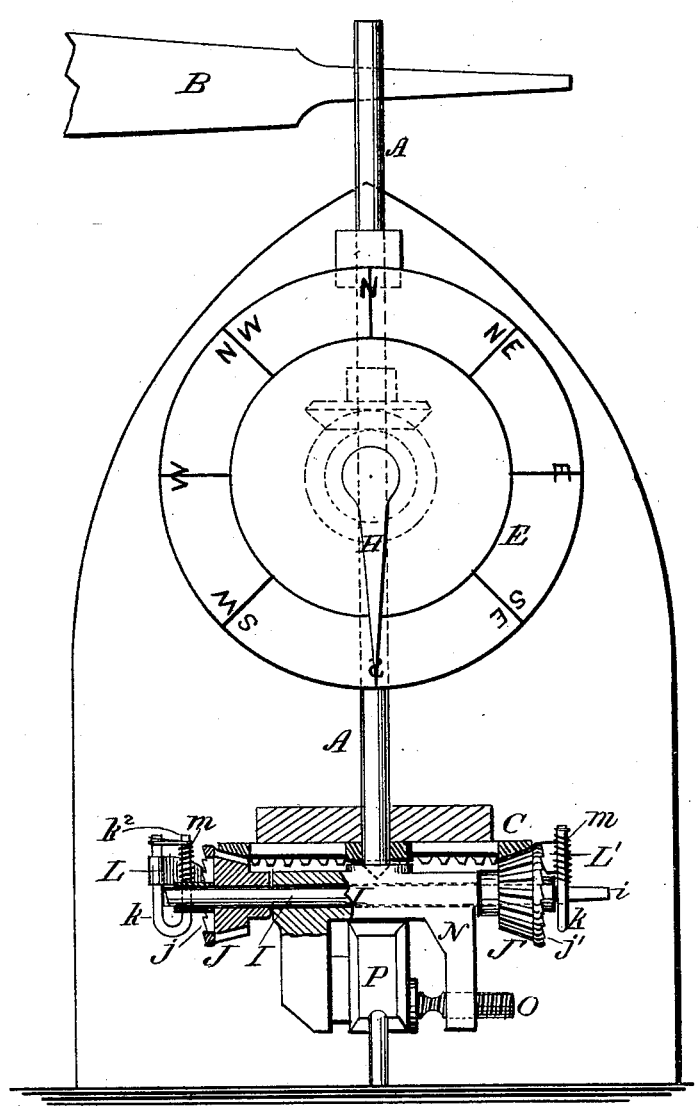
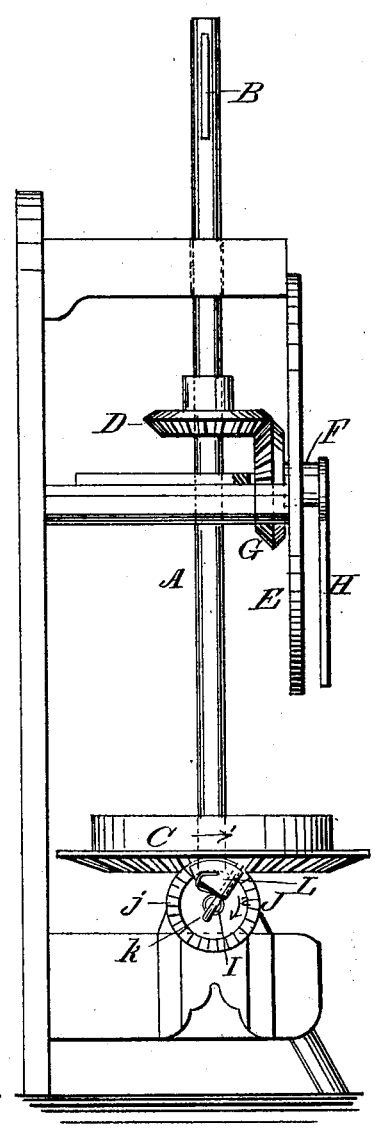
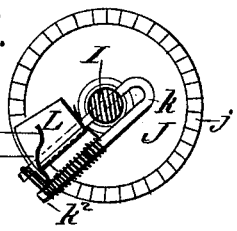
WITNESSES:
INVENTOR:
A. Hitt
BY Munn & Co.
ATTORNEYS.

UNITED STATES PATENT OFFICE.

ADRIAN HITT, OF RUSHVILLE, INDIANA, ASSIGNOR TO HIMSELF, AND AUGUSTA ALMEDA THOMPSON, OF JERSEY CITY, NEW JERSEY.

WIND-VANE MOTOR FOR CLOCKS.

SPECIFICATION forming part of Letters Patent No. 366,834, dated July 19, 1887.

Application filed February 11, 1887. Serial No. 227,243. (No model.)

*To all whom it may concern:*

Be it known that I, ADRIAN HITT, of Rushville, Rush county, Indiana, have invented a new and Improved Wind-Vane Motor, of which the following is a full, clear, and exact description.

The purpose of this invention is to use the power of the wind on a vane, and thereby to wind the mechanism of a time-piece or any other power-storing machine, and also to indicate on a dial the direction of the wind.

It consists of an upright shaft carrying a wind-vane on its upper end and in gear-wheels and shafts by which the power is transmitted; also, in a dial and index, all of which are hereinafter fully described.

Reference is to be had to the accompanying drawings, forming part of this specification, in which similar letters of reference indicate corresponding parts in all the figures.

Figure 1 is a front sectional elevation of my wind-vane motor. Fig. 2 is a side elevation of the same; and Fig. 3 is a view of the ratchet and pawl, showing the manner of their connection with the horizontal shaft.

A is an upright shaft, the top of which is designed to project above the roof of the house and which supports an ordinary wind-vane, B. Shaft A carries a bevel gear-wheel, D, which meshes with another bevel gear-wheel, G, on a horizontal shaft, F, the outer extremity of which carries a pointer, H, that traverses a dial, E, and shows the direction in which the vane B is turned by the wind, all in the ordinary manner.

On the lower end of the shaft A is a beveled gear-wheel, C, which meshes with two loose beveled gear-wheels, J and J', on the shaft I. The wheels J and J' have formed on them ratchets *j* and *j'*, the points of the teeth of the ratchets being so arranged that they will engage the pawls L and L' in the same direction of rotation of the wheels J and J'.

*k k* are U-shaped rods, one end of each of which passes through the shaft I and carries the pawl L or L', and the other ends, $k^2$, carry each a spring, *m*, which is coiled about and secured to it. The ends *m'* of springs *m* press against the pawls L L' and secure their engagement with the ratchets *j j'*.

The end *i* of shaft I is to be suitably connected with the winding-stem of a clock or time-piece, or with any other power-storing mechanism, in such a manner that when the mechanism is fully wound no injury will result thereto from the continuous rotation of shaft I.

O is a screw by which the frame N, carrying the mechanism, is secured to the fixed block P.

The operation is as follows: The vane B is acted on by the wind and causes the shaft A to move correspondingly on its axis, and by it and the gear-wheels D and G the pointer H is turned and made to indicate on the dial E the direction of the wind. By the motion of shaft A and gear-wheel C the wheels J and J' are rotated both at the same time, but in opposite directions. When the wheel C is turned in the direction indicated by the arrow 1 in Fig. 2, the wheel J will rotate in the direction shown by arrow 2, and the teeth of the ratchet *j* will engage the pawl L, and thus the shaft I will be caused to rotate. At the same time the wheel J' will rotate in the direction opposite to the motion of wheel J; but as the teeth of its ratchet *j'* will not engage the pawl L' the rotation of the wheel J' will have no effect on the rotation of the shaft I; but when the wheel C rotates in the opposite direction to that indicated by the arrow 1 the teeth of the ratchet *j'* of wheel J' will engage the pawl L', and thus the shaft I will be rotated in the same direction as by the wheel J. It will thus be seen that in whichever way the shaft A and wheel C may turn, the shaft I will, by them and the wheels J and J' and pawls L and L', be rotated continuously in one direction, and will consequently wind a clock or any mechanism which may be attached to said shaft I.

Among the obvious advantages of my invention are the indication of the direction of the wind and the perpetual winding of a clock or other time-piece.

My invention may also be applied to the winding of any suitable power-storing mechanism which may be employed for any useful purpose—such as the running of a sewing-machine.

Having thus described my invention, I claim as new and desire to secure by Letters Patent—

1. The combination, substantially as described, with a wind-vane and its shaft, of gear-wheels, ratchet mechanism, and a winding-shaft, as set forth.

2. The combination of shaft A, vane B, and wheel C, with the wheels J and J', having ratchets $j$ and $j'$, the pawls L L', and shaft I, for the purpose of producing a continuous rotation of shaft I, as set forth.

3. The combination, with the shaft I, of the rods $k$, constructed substantially as described and passed through the ends of the shaft, the pawls L L', and springs $m$, as set forth.

ADRIAN HITT.

Witnesses:
GEORGE M. CULVER,
HENRY L. GOODWIN.